United States Patent
Martin et al.

(10) Patent No.: US 6,191,780 B1
(45) Date of Patent: Feb. 20, 2001

(54) CUSTOMIZABLE MULTIMEDIA SEGMENT STRUCTURES

(75) Inventors: John R. Martin, Rockford, IL (US); Charles D. Rentmeesters, Madison, WI (US)

(73) Assignee: Arachnid, Inc., Rockford, IL (US)

( * ) Notice: Under 35 U.S.C. 154(b), the term of this patent shall be extended for 0 days.

(21) Appl. No.: 09/047,653

(22) Filed: Mar. 25, 1998

(51) Int. Cl.[7] ....................... G06F 17/00
(52) U.S. Cl. .............. 345/302; 707/104; 705/15; 705/27
(58) Field of Search .............. 707/104; 345/302; 705/15, 27

(56) References Cited

U.S. PATENT DOCUMENTS

| | | | |
|---|---|---|---|
| 5,355,302 | 10/1994 | Martin et al. | 364/410 |
| 5,401,033 | 3/1995 | Lychock, Jr. | 273/371 |
| 5,640,560 | 6/1997 | Smith | 395/615 |
| 5,640,590 * | 6/1997 | Luther | 345/302 |
| 5,680,619 * | 10/1997 | Gudmundson et al. | 395/701 |
| 5,682,326 * | 10/1997 | Klinger et al. | 345/302 |
| 5,761,655 * | 6/1998 | Hoffman | 707/4 |
| 5,892,966 * | 4/1999 | Petrick et al. | 712/36 |
| 5,941,953 * | 8/1999 | Bergmann et al. | 709/234 |
| 5,953,005 * | 9/1999 | Liu | 345/302 |

FOREIGN PATENT DOCUMENTS

| | | |
|---|---|---|
| 2170943 | 8/1986 | (GB) . |
| WO 97/04394 | 2/1997 | (WO) . |
| WO 97/09708 | 3/1997 | (WO) . |

OTHER PUBLICATIONS

Wall, et al., "An Overview of Perl," XP–002126585 O'Reilly & Associates (1996).
Bulterman, Dick C. A. "Embedded Video in Hypermedia Documents: Supporting Integration and Adaptive Control." ACM Transactions on Information Systems, vol. 13, No. 4. Association for Computing Machinery. ©1995. pp. 440–470.*
Printout of Java™ code for "connect4" applet. Found online at http://javaboutique.internet.com. Upload date Dec. 1, 1996.*

* cited by examiner

*Primary Examiner*—Joseph H. Feild
*Assistant Examiner*—Michael J. Perkins
(74) *Attorney, Agent, or Firm*—McAndrews, Held & Malloy, Ltd.

(57) ABSTRACT

An electronic devices executes from memory an advertising multimedia segment structure that includes a command segment storing multimedia commands that in turn invoke multimedia effects and that is supported by a definition segment that invokes the command segment. The definition segment also includes argument definitions for the tokenized arguments in the command segment. The command segments are protected against alteration by encryption, while the definition segments are alterable to provide locally customized advertisements in accordance with the tokenized arguments in the command segments. A library of downloadable command segments provides predefined advertisements, displays, and the like for the electronic device.

12 Claims, 1 Drawing Sheet

200

Example MAC file: "template.mac"

202
```
SETCOLOR 254
CIRCLE 1 100 50 540 430
LINE 540 50 100 430

SETFONT 2
SETTEXTBOX 0 0 100 100 540 150
TEXT ^TEST^
```

204 Example DAT file: "ad1.dat"

```
TEMPLATE = C:\template.mac
TEST= "This is a test message."
```

Example MAC file: "template.mac"

```
SETCOLOR 254
CIRCLE 1 100 50 540 430
LINE 540 50 100 430

SETFONT 2
SETTEXTBOX 0 0 100 100 540 150
TEXT ^TEST^
```

Example DAT file: "ad1.dat"

```
TEMPLATE = C:\template.mac
TEST="This is a test message."
```

CUSTOMIZABLE MULTIMEDIA SEGMENT STRUCTURES

BACKGROUND OF THE INVENTION

The present invention relates generally to a segment structure which allows electronic devices to generate multimedia displays. In particular, the invention relates to a segment structure that allows customization of selected portions of the multimedia displays while maintaining the integrity of other selected portions of the multimedia displays.

Computer jukeboxes and electronic dart games (using dart boards interfaced with a controller) generally fall into the category of electronic amusement devices. Examples of such devices are disclosed in U.S. Pat. Nos. 5,355,302 to Martin et al., 5,114,155 to Tillery et al, and 5,401,033 to Lychock, Jr which are incorporated herein by reference in their entirety. Electronic amusement devices typically make their way from a manufacturer to a distributor then to a route operator who installs the electronic amusement devices in establishments including hotels, bars, casinos.

As electronic devices, including electronic amusement devices, have become more sophisticated, they have incorporated hardware to produce audio, visual, or other effects. Any electronic device including even rudimentary audio, video, or other effects may be used to communicate information, for example, advertisements, via multimedia presentations. Thus, a computer jukebox or an electronic dart game may include audio or visual hardware to produce effects used in an advertisement. Such electronic amusement devices have also become capable of providing another source of income by displaying multimedia displays of advertisements programmed to run when certain multimedia capabilities of the electronic device are available.

As an example, computer jukeboxes provide a selection menu allowing a patron to select a particular song that he or she may want to hear. However, when a patron is not selecting a song, an advertisement (which may or may not generate revenue) may be displayed on a screen attached to the computer jukebox, and/or played through speakers attached to the computer jukebox.

Even if an advertisement is displayed, there is no guarantee that it will provide a suitable match to a local business. As an example, a predefined pizza advertisement generally would not match the particular names, addresses, or phone numbers of pizza establishments in a particular locality. The diverse types of local business in the communities in which electronic devices are installed leads directly to diverse requirements for the advertisements displayed on the electronic devices.

It is also desirable, in some instances, to prevent a predefined advertisement from being modified in whole or in part. For example, advertisers that expend a great deal of money to develop national-based advertisements typically may require assurances that the advertisement will not be modified when displayed on an electronic device. In other instances, only a portion of the advertisement (for example, the text or graphics generally, or the text or graphics displayed at particular times or places in the advertisement) may need protection from customization.

A need exists for a mechanism by which customized or non-customized advertisements may be displayed on electronic devices installed in diverse establishments.

BRIEF SUMMARY OF THE INVENTION

It is an object of the present invention to provide segment structures that enable route operators or other intermediate distribution personnel to produce customized multimedia displays (for example, advertisements) for display on electronic devices. Thus, the original creator of an advertisement need not be directly involved in the production of a customized multimedia display, but may allow the intermediate distribution personnel to provide customization services.

It is a further object of the present invention to enable an electronic device to accept segment structures, text, and graphics data for use in displaying customized multimedia displays. As one example, the electronic device may include a high density disk drive used to load segment structures, text, and graphics attributes defining a customized multimedia display.

It is another object of the present invention to allow a single predefined display to be enhanced and modified in many different ways to produce numerous customized multimedia displays. Each customized multimedia display may be defined by a segment structure that protects certain elements of the multimedia display from alteration while allowing alteration of other elements of the multimedia display.

Still a further object of the present invention is to provide a mechanism for downloading and storing multimedia displays defined by a multimedia segment structure as well as executing the segment structure to generate the multimedia displays on a display, speakers, and the like associated with the electronic device. The segment structures may be executed according to a play sequence, for example, which proceeds through an alphabetic list of segment structures sequentially, and loops back to the first segment structure when the end of the list is reached.

Another object of the present invention is to provide predefined advertisements that include literal arguments and tokenized arguments. The present invention may protect files referenced by literal arguments with encryption to prevent substitution or modification by unauthorized personnel.

The present invention provides a multimedia segment structure defining customizable multimedia presentations. The multimedia segment structure includes at least one MAC segment with multimedia commands invoking multimedia effects. At least one of the multimedia commands includes a tokenized argument. The multimedia segment structure also includes at least one DAT segment including at least one command invoking the MAC segment. The DAT segment also includes one or more argument definintions corresponding the tokenized arguments used in the MAC segments. Thus, the DAT segment may customize a multimedia display by changing the value of the tokenized argument.

The commands in the MAC segment, or the MAC segment as a whole may be protected against alteration by encryption and/or password protection. The tokenized arguments thereby provided customization of an advertisement in the DAT segment while basing the advertisement on an underlying and unalterable structure defined in the MAC segment. As an example, the DAT segment may define the token PICT1 as "jukebox_add.jpg" or as "dart_game_add.jpg" to produce a customized advertisement relating to jukeboxes or dart games, respectively.

The commands in the MAC segment may instruct the hardware in the electronic device, for example, to produce graphics and text on the display or actuate attached devices. For example, "LINE 540 50 100 430" draws a line from 540, 50 to 100, 430 on the display and "TEXT Arachnid" draws the text "Arachnid" on the display. The commands may also instruct the electronic device to display a bitmap, display an animation or movie, delay or wait, select particular fonts for text display, set transparent colors, and the like.

Other objects, features and advantages of the present invention will be readily apparent from the following description of certain preferred embodiments taken in conjunction with the accompanying drawings, although variations and modifications may be effected without departing from the spirit and scope of the novel concepts of the disclosure.

DETAILED DESCRIPTION OF THE INVENTION

Figure 1:
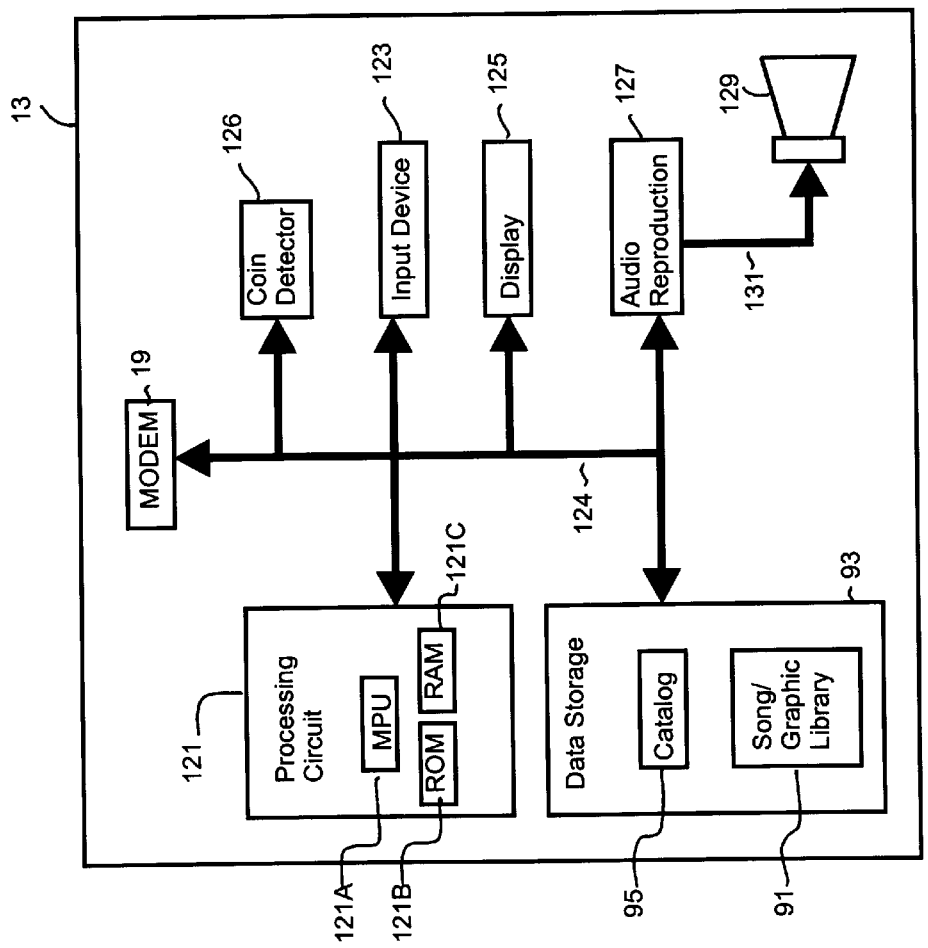
FIG. 1 shows an electronic device which supports the execution of multimedia segment structures. The electronic device is a computerized jukebox capable of storing digital song data and running multimedia segment structures defining a multimedia presentation.

Turning now to FIG. 1, a computerized jukebox 13 is shown having a computer controlled sophisticated audio production capability wherein each jukebox 13 is programmed to play songs that have been digitally compressed and stored in a large-volume data storage unit 93. The data storage unit 93 may be implemented as a magnetic memory (for example, a hard disk drive) and/or an optical memory (for example, a Compact Disk drive). The jukebox 13 is one example of an electronic device that may produce multimedia displays under control of a segment structure (discussed in detail below). The storage unit 93 and associated song library 91 may be an optical memory or any other available large volume nonvolatile computer memory that provides both read and write access.

A central management system (not shown) may communicate with each jukebox 13 via a transmission link or communications interface. For example, the central management system and each jukebox 13 may use the modem 19 to maintain serial communication on the communications interface. The communications interface may be a wire system such as public or private telephone lines or the like. However, the modems 19 may be replaced with RF (radio frequency) transceivers and associated antennas, a floppy disk drive, or a serial/parallel/network connection for direct communication with, for example, a laptop computer.

The jukebox 13 also includes a processing circuit 121 which contains a microprocessor 121A, read only memory (ROM) 121B and random access memory (RAM) 121C. As in conventional computer systems, the microprocessor 121A operates in accordance with the software program contained in the ROM 121B or loaded into the RAM 121C from hard disk or floppy disk. The RAM 121C is also used to store program variables, graphics and text data, and a variety of other data types. The processing circuit 121 controls the operation and flow of data into and out of the jukebox 13 through the modem 19 via a bus 124. Using the bus 124, the processing circuit 121 also controls a visual display 125, one or more input devices 123 and a coin/bill detector 126 to provide the user with an interactive interface to the jukebox 13. The input devices 123 provide signals representing user inputs such as displayed song selection. The input devices 123 may be implemented with a keyboard, touchscreen display, or membrane switches, for example. The display 125 displays alphanumeric information as well as pictorial graphics to interface with the user. The coin/bill detector 126 is responsive to one or more coins or bills input by a customer to determine whether the proper amount of money has been input and to provide money detect signals coupled to the processing circuit. The processing circuit 121 further controls, via the bus 124, an audio reproduction circuit 127 coupled to a speaker system 129 along a bus 131 to provide an audio output to the user.

As noted above, the jukebox 13 may run multimedia segment structures defining, for instance, advertisements. The operation of the multimedia segment structure will be described with reference to the jukebox 13. It is noted however, that any electronic device may run segment structures if the electronic device includes a processing circuit and software capable of interpreting the multimedia segment structures.

Figure 2:
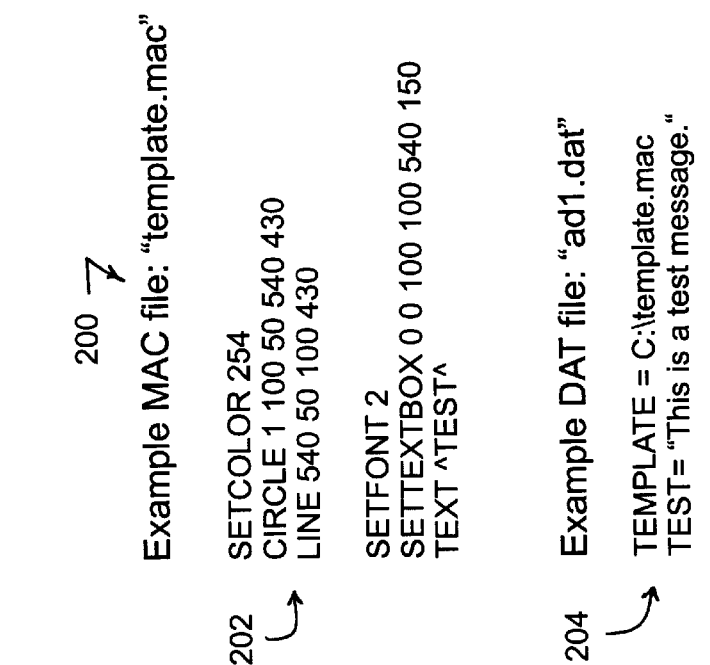
FIG. 2 shows an example of a MAC segment that defines an underlying template for an advertisement and a DAT segment that invokes the MAC segment as well as defines a token used in the MAC segment.

Turning now to FIG. 2, that figure shows an example of two segments comprising a multimedia segment structure 200. An unencrypted control segment 202 (illustrated as stored in the file "template.mac") and a definition segment 204 (illustrated as-stored in the file "ad1.dat") are shown. The jukebox 13 generally executes multimedia segment structures according to a play sequence. The play sequence, which may be fixed or dynamically determined, defines which multimedia segment structures to execute and when to execute them. For example, the segment structures may be executed according to a play sequence which proceeds through a list of segment structures sequentially, and loops back to the first segment structure when the end of the list is reached.

The definition segment 204 may, in turn, invoke a control segment that defines an underlying predefined advertisement. The control segment 202 generally includes commands that invoke multimedia effects or perform control functions. For example, ordered sequences of commands may instruct the electronic device to generate lines, circles, or other graphics on a display, and control internal or external lights, buzzers, flags, alarms and the like connected to the electronic device. Control segments or definition segments may be provided, for example, as files stored on a hard disk or the like, as data stored in ROMs or loaded into RAM, or as files or data stored on a floppy disk.

As one example, a drawing command (e.g., "CIRCLE 1 100 50 540 430" in the control segment 202) may be interpreted by the processing circuit 121 to generate a circle outline on the display 125 bounded by X,Y locations 100, 50 and 540, 430. Additional examples include the command "LINE 540 50 100 430" and "TEXT ^TEST^" which draw a line from 540, 50 to 100, 430 and draw text corresponding to TEST on the display 125. Exemplary commands are given below in Table 1.

TABLE 1

| Command | Explanation |
| --- | --- |
| CIRCLE<type><left><top><right><bottom> | Draws a circle, type 0 is filled, type 1 is a frame bounded by left, top and right, bottom. |
| LINE<x1><y1><x2><y2> | Draws a line from x1, y1 to x2, y2. |
| RECTANGLE<width><left><top><right><bottom> | Draws a rectangle width wide bounded by left, top and right, bottom. |

TABLE 1-continued

| Command | Explanation |
| --- | --- |
| TEXT<text> | Draws text in an area defined by SETTEXTBOX. |
| SHOWFILE<left><top><right><bottom><file> | Shows a graphics file bounded by left, top and right, bottom. |
| SHOWFILESECTION<src-left><src-top><src-right><src-bottom><dest-left><dest-top><dest-right><dest-bottom><file> | Shows a section of a graphics file defined by src-left, src-top and src-right, src-bottom in an area defined by dest-left, dest-top and dest-right, dest-bottom. |
| SETFONT<font-number> | Sets the TEXT font to font-number. |
| SETCOLOR<color> | Sets the color (e.g., 0–255 or RGB value) used to draw graphics and text. |
| SETTEXTBOX<horz-justify><vert-justify><left><top><right><bottom> | Sets up a text box, where horz-justify and vert-justify = −1 for left, 0 for center, 1 for right, bounded by left, top and right, bottom. |
| SETTRANSPARENTCOLOR<color> | Sets the color which is treated as transparent. |
| DELAY<time-ms> | Delays for time-ms in milliseconds. |
| SETLIGHT<light><state> | Sets the light identified by light to the state (e.g., the left light to on, off, or flashing). |

Note that the commands accept one or more arguments, either in literal form (for example, specifically naming text, XY locations, or filenames as in "arachnid.bmp"), or in a tokenized form in which identifiers (for example, ^TEST^) are used as placeholders for an actual argument. The objects referenced by a literal argument (including graphics files, sound files, and animation files, for example) may be encrypted to prevent substitution or modification by unauthorized personnel.

The tokenized arguments may be flagged in the control segment using non-alphanumeric characters (e.g., the caret (^) symbol). Thus, TEXT ^TEST^ in FIG. 2 may be interpreted by the jukebox 13 as a reference to a definition for the token TEST in a supporting segment (for example, the definition segment 204). The supporting definition segment may then, for example, define TEST as "This is a test message.".

The supporting DAT segment may be modified by route operators to create custom advertisements simply by changing the values of the tokenized arguments in a definition segment. A DAT segment is not always necessary, however. If the underlying advertisement definition in a MAC segment does not contain any tokens, or cannot otherwise be modified (e.g., due to encryption), then the play sequence may indicate that the MAC segment should be played directly (without executing a definition segment first).

On the other hand, a customized advertisement will include a customized DAT segment using a segment association to reference a MAC segment. The play sequence will then indicate that the DAT segment will be executed (rather than the MAC segment). The first step in executing a DAT segment is invoking an underlying predefined MAC segment. Thus, in FIG. 2, the DAT segment 204 invokes (with the TEMPLATE command) the MAC segment "template.mac" 202. The TEMPLATE command is one example of an association between a definition segment and a MAC segment. Other segment associations may be used, including pointers, program branches, and program jumps, for example. Program branches or jumps may be used, for example, when a MAC segment and a DAT segment are concatenated into a single segment or stored in a single file (similar to branches, jumps, or function calls in the 'C' language). Similarly, a DAT file may use a pointer, for example, when a MAC segment is stored in RAM or ROM at a known location.

The jukebox 13 also reads any definitions provided in the DAT segment 204. The jukebox 13 thus assigns the text "This is a test message." to the token TEST. When the jukebox invokes the MAC segment 202, the jukebox sets the drawing color to 254 (which may be an absolute color number or an index into a color table), draws a circle, draws a line through the circle, changes font to font number 2 (which may correspond to any predefined font stored in the jukebox 13), sets up a centering text box bounded by 100, 100 and 540, 150, and displays text corresponding to the token TEST, defined in the DAT segment 204 as "This is a test message.".

MAC and DAT segments containing predefined advertising templates and customized token definitions may be stored in each electronic device, may be transmitted by the central management system to the electronic device periodically, or may be transferred to the electronic device with a floppy disc, network connection, or serial/parallel port connection. Similarly, the graphics, text, and the like that support the advertisements may be stored in the electronic device or transferred to the electronic device by the methods listed above. A catalog of MAC segments defining a set of predefined advertisements may be entrusted to route operators or other intermediate distribution personnel who are responsible for generating modified DAT segments defining modified advertisements based on an underlying MAC segment in the catalog.

There are many instances in which advertisements may benefit from customization using DAT segments. For example, a particular electronic device installed in a bar may need to display customized advertisements relating to local pizza delivery services. A route operator may then choose a predefined pizza advertisement control file from a catalog of MAC files. Because the predefined control file would typically not include the correct name, address, or phone number for the local pizza service, the route operator may change token values in an associated definition file to customize the advertisement for Tony's Pizza, for example. The resulting customized pizza advertisement may thereby use predefined graphics files referenced by the control file, while including customized text for the name, address, and/or phone number for the local pizza establishment. As another example, a customized advertisement may provide job listings for local employment agencies. Thus, a definition file may change the value of tokens provided in an underlying control file, for instance, to add a graphic for the employment agency logo, to add text for the employment agency's name and slogan, and to add several lines of text listing the actual job openings.

It is also desirable, in some instances, to prevent a route operator from modifying certain parts of the control segment (or the entire control segment). For example, advertisers that expend a great deal of money to develop national-based advertisements represented by a control segment typically require assurance that the advertisement will not be modified when displayed on an electronic device. In other instances, only a portion of the advertisement (for example, the text or graphics generally, or the text or graphics displayed at particular times or places in the advertisement) may need protection from customization by a route operator. Thus, in a preferred embodiment, encryption or password protection is applied to commands in the control segment or the control segment itself to prevent alteration. Similarly, encryption may be further applied to the literal arguments of the control segment.

It is noted that the text commands discussed above and shown in Table 1 are only one way of implementing the control and definition segments defining an advertisement and that sophisticated scripting languages may be used to generate extremely versatile advertisements. Another approach, however, includes compiling the text commands into a machine-readable form, or directly providing sequences of binary codes that the processing circuit 121 is able to interpret to control the multimedia functions of an electronic device. Furthermore, a control segment and associated definition segments may be concatenated into a single file for storage, retrieval, or transmission purposes.

While particular elements, embodiments and applications of the present invention have been shown and described, it will be understood, of course that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electronic device for executing a customized advertisement multimedia display, the electronic device comprising:

a memory storing a multimedia segment structure, the multimedia segment structure comprising:

a. a control segment implementing a predefined advertisement and comprising at least one multimedia command invoking at least one multimedia effect, the multimedia command including a placeholder tokenized argument; and b. a definition segment comprising a segment association invoking the control segment and an argument definition of the tokenized argument, the argument definition customizing the predefined advertisement for local display;

the memory also storing a play sequence listing the definition segment and thereby determining when the multimedia segment structure is executed; and a processor for executing the multimedia segment structure in accordance with the play sequence.

2. The electronic device of claim 1, wherein at least one of the multimedia commands in the control segment is protected against alteration by encryption.

3. The electronic device of claim 1, wherein the control segment is protected against alteration by encryption.

4. The electronic device of claim 1 configured as a computer jukebox further comprising:

speakers connected to a digital to analog converter;

a selector for causing the electronic device to retire and play data representing a song selected from a plurality of songs stored by the electronic device in the memory; and a communications interface for receiving the control segment and the play sequence from a central management system storing a catalog of predefined advertisement control segments.

5. The electronic device of claim 4, further comprising a display connected to the processor.

6. The electronic device of claim 4, wherein the control segment is protected against alteration by encryption.

7. The electronic device of claim 1 configured as an electronic dart game further comprising:

a dart board interfaced with the processor; and a communications interface for receiving the control segment and the play sequence from a central management system storing a catalog of predefined advertisement control segments.

8. The electronic device of claim 7, wherein the control segment is protected against alteration by encryption.

9. The electronic device of claim 1, wherein the control segment further comprises a second multimedia command with a literal argument.

10. The electronic device of claim 9, wherein the literal argument refers to an encrypted graphics file.

11. The electronic device of claim 1, wherein the tokenized argument is flagged using non-alphanumeric characters.

12. The electronic device of claim 1, wherein the control segment is transferred into the memory from a catalog of predefined advertisement control segments.

* * * * *